June 20, 1972  J. F. LYNCH ET AL  3,671,206
ALLOY, FUSION OVERLAY AND PROCESS
Filed Jan. 12, 1971  3 Sheets-Sheet 2

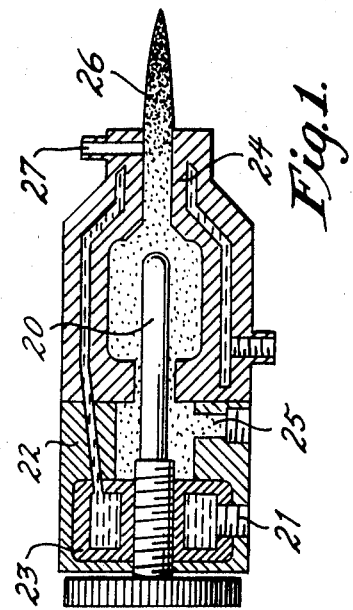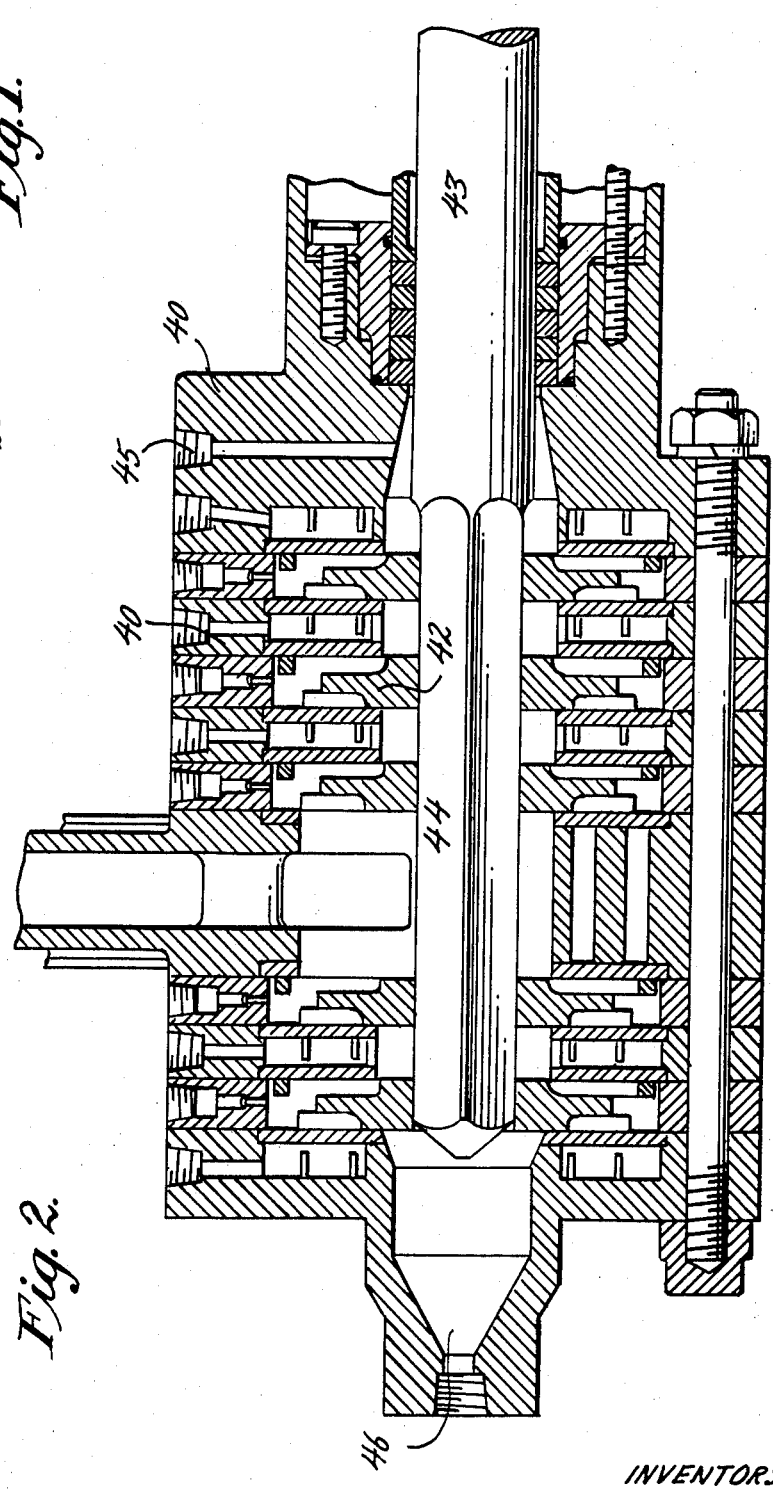

INVENTORS.
JOHN F. LYNCH
WILLIAM BRYSON SCOTT
ALFRED J. PAOLETTI
BY
Jackson, Jackson & Chovanes
ATTORNEYS.

INVENTORS.
JOHN F. LYNCH
WILLIAM BRYSON SCOTT
ALFRED J. PAOLETTI
ATTORNEYS.

3,671,206
ALLOY, FUSION OVERLAY AND PROCESS
John F. Lynch, Chester, Pa., and William Bryson Scott, Cherry Hill, and Alfred J. Paoletti, Willingboro, N.J., assignors to Marco Development Co., Inc., New Castle, Del.
Filed Jan. 12, 1971, Ser. No. 105,815
Int. Cl. B32b 15/00; C22c 19/00
U.S. Cl. 29—196.6
9 Claims

ABSTRACT OF THE DISCLOSURE

In making pump parts such as impellers, shafts, bearings and the like, a suitable backing such as steel is coated with a fused overlay of an alloy of tin, bismuth, silicon, boron, iron, molybdenum, optionally tungsten, and the balance nickel. This gives to the parts coated bearing properties and corrosion resistance without the danger of excessive porosity. The coating is deposited and fused by conventional overlay methods.

DISCLOSURE OF INVENTION

The present invention relates to an alloy, a pump part coated with a fused overlay of the alloy and a process of making a pump part by depositing and fusing.

A purpose of the invention is to deposit on a backing such as steel an alloy consisting of tin, bismuth, silicon, boron, iron, molybdenum, optionally tungsten, and the balance nickel.

A further purpose is to produce an alloy having the following composition by weight:

|  | Percent |
|---|---|
| Tin | 4–8 |
| Bismuth | 4–8 |
| Silicon | 2–5 |
| Boron | 2–5 |
| Iron | 2–5 |
| Molybdenum | 15–30 |
| Tungsten | 0–4 |
| Nickel | Balance |

A further purpose is to deposit the overlay on parts which have previously been subjected to excessive wear in pump impellers, shafts, bearings, stator plates, housings, extrusion screws and linears which have previously been subjected to excessive wear in service.

A further purpose is to use fusion spraying, as for example plasma spraying, or spray and fusion overlaying, or welding overlay to deposit the coating.

A further purpose is to produce a hard overlay alloy which will have adequate wear resistance, good bearing properties as exhibited by the property of anti-galling, and excellent corrosion resistance.

Further purposes appear in the specification and in the claims.

FIG. 1 is a diagrammatic longitudinal section of a plasma spray gun used in the invention.

FIG. 2 is a chemical reactor pump having impeller plates interposed by stator plates shown in axial section.

Figure 3:
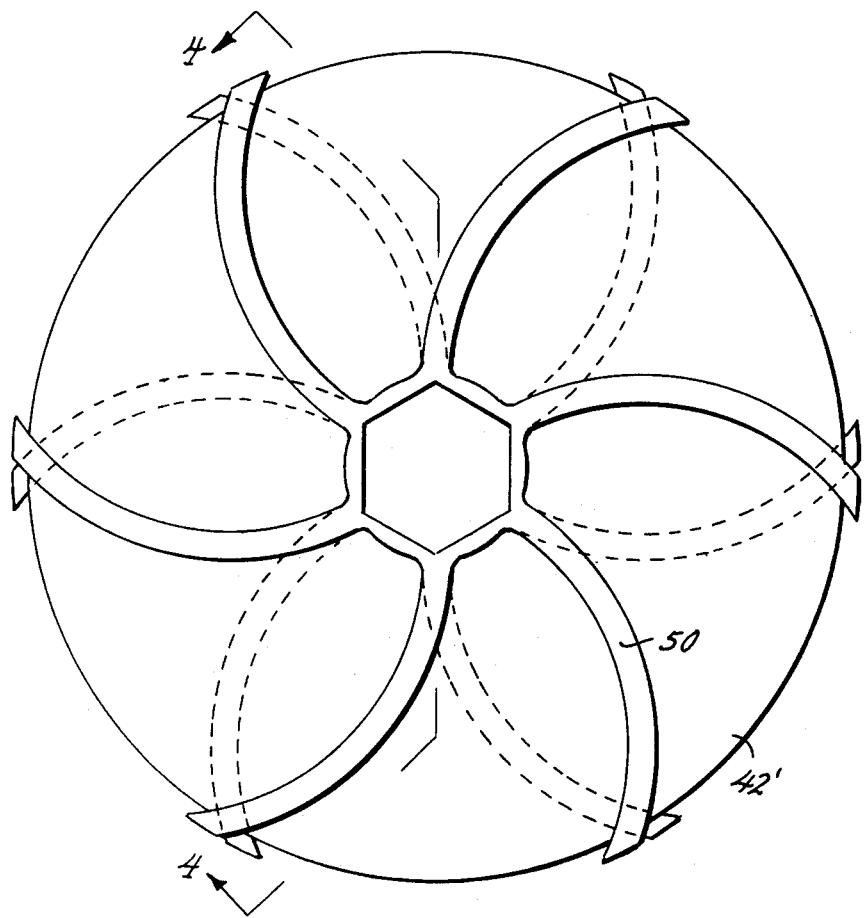
FIG. 3 is a side elevation of one impeller plate to which the invention has been applied.

In the prior art pump impellers and other wear parts of pumps requiring some anti-galling properties and corrosion resistance have been commonly made according to Thomas and Williams, U.S. Pat. 2,743,176, granted Apr. 23, 1956, for Alloy and Method of Manufacture Thereof. The alloy used has the following composition:

|  | Percent |
|---|---|
| Nickel | 50–70 |
| Chromium | 10–15 |
| Molybdenum | 2–3 |
| Tin | 2.5–5 |
| Bismuth | 2–4 |
| Silicon | 0.25–0.75 |
| Manganese | 0.50–1.5 |
| Iron | Balance |

This alloy used in the form of castings has given a great deal of trouble because of the difficulty in making sound castings on account of the vaporization of tin and bismuth, and the excessive problem of dross. Castings commonly are made under conditions of frothing, foaming, and wildness of metal and presence of gas cavities.

In order to reduce the difficulty in production, and at the same time to effectively protect against corrosion and impart anti-galling properties to pump parts, such as rotor plates, stator plates, shafts, extrusion screws, liners, housings and bearings, I have discovered an alloy which can be deposited as a coating on the fabricated or cast steel plates or other backing metal and which is free from difficulty with porosity, while at the same time producing adequate anti-galling properties and protecting against corrosion.

The alloy of the invention has the following composition by weight:

|  | Percent |
|---|---|
| Tin | 4–8 |
| Bismuth | 4–8 |
| Silicon | 2–5 |
| Boron | 2–5 |
| Iron | 4–7 |
| Molybdenum | 15–30 |
| Tungsten | 0–4 |
| Nickel | Balance |

In addition it may have as impurities traces of iron, cobalt and copper.

The tin is slightly soluble in the nickel and acts as a carrier for the bismuth. The bismuth imparts anti-galling properties along with the tin. Silicon and boron cooperate in producing a hard alloy, and also contribute importantly in deoxidizing and fluxing during fusion of the coating.

The molybdenum improves corrosion resistance, particularly against chloride, as well as increasing the strength of the alloy.

The tungsten improves the strength of the alloy.

The iron contributes to grain refinement and thus increases corrosion resistance.

The nickel contributes to corrosion resistance.

The alloy is particularly good in two forms. We prefer the embodiment having tungsten. In one form a lower content of molybdenum is used with tungsten, having the following composition by weight:

|  | Percent |
|---|---|
| Tin | 4–8 |
| Bismuth | 4–8 |
| Silicon | 2–5 |
| Boron | 2–5 |
| Iron | 4–7 |
| Molybdenum | 15–17 |
| Tungsten | 3–4 |
| Nickel | Balance |

In another form higher molybdenum is used without tungsten, having the following composition by weight:

| | Percent |
|---|---|
| Tin | 4–8 |
| Bismuth | 4–8 |
| Silicon | 2–5 |
| Boron | 2–5 |
| Iron | 4–6 |
| Molybdenum | 26–30 |
| Nickel | Balance |

While the alloy may be applied by any overlaying technique, such as welding overlay, or to spray and fusion overlaying, it is preferably aplied by fusion spraying with a plasma torch, the alloying ingredients being introduced as powder.

Relatively thin overlay surfaces may be produced by the invention, for example as thin as 0.005 inch or the overlay may be quite thick, for example 3/8 inch, although an overlay of thickness of 3/16 inch is a more practical limit.

The plasma torch may be either of the transferred arc or the non-transferred arc type.

FIG. 1 conventionally shows a plasma gun consisting of an axial electrode 20 connected to an electric terminal 21, insulated by a nylon sleeve 22 and cooled by a water jacket 23. An arc is established by the electrode 20 and a water cooled tubular electrode 24. A gas is introduced at 25, such as argon, to form the plasma 26 into which powder is introduced through a side port 27. The powder may have a size between 200 and 250 mesh per linear inch, although coarser powder may be used and finer powder is preferred.

FIG. 2 shows in axial section a chemical reactor pump consisting of a housing 40, stator plates 41, impeller plates 42 on a suitable shaft 43 having a hexagonal portion 44 engaging the impeller plates. Inlet is at 45, and the outlet is at 46. The details are shown more fully in Lynch et al., U.S. Pat. 3,356,461, granted Dec. 5, 1967 for Condensate Cone for Continuous Chemical Reactors.

Figure 4:
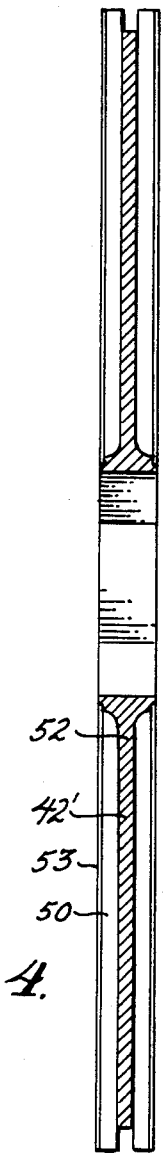
FIG. 4 is a section of FIG. 3 on the line 4—4 showing the overlay coating.

In FIGS. 3 and 4 an impeller plate 42' is shown having vanes 50 extending laterally to the edge of the impeller plate, curving in one direction on one side of the impeller plate and in another direction on the other side of the impeller plate to pump the fluid radially out at one side and radially in at the other side. There is a hub at 51.

The impeller has a steel backing 52, suitably a steel casting and it has a surface layer 53 on the wear parts which is deposited by fusion spraying, and machined down to size.

Figure 5:
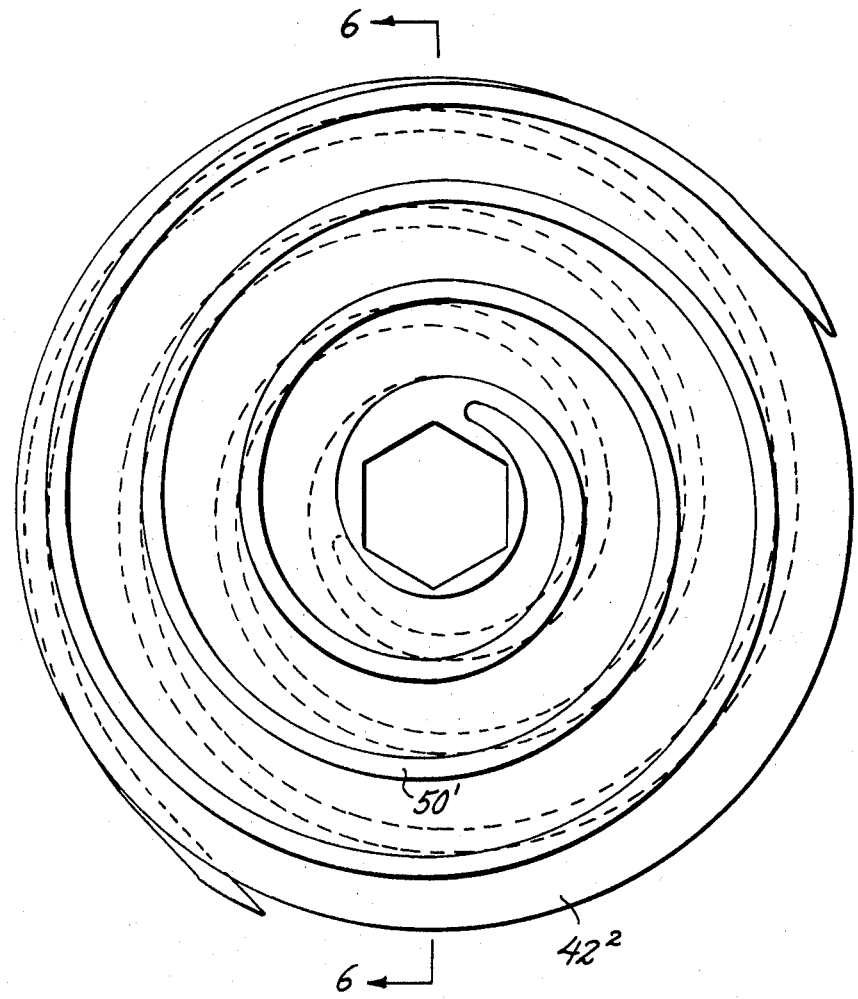
FIG. 5 is a side elevation of another type of impeller plate to which the invention has been applied.
Figure 6:
FIG. 6 is a section of FIG. 5 on the line 6—6.

In FIG. 5 an impeller plate $42^2$ has a backing, suitably a steel casting 52, and has spiral vanes 50' which spiral in opposite directions on opposite sides of the impeller plate. The vanes and other wear parts are machined below the dimension required and then a fusion spray coating 53 is applied according to the invention and machined down to proper size.

Example 1

An alloy having the following composition by weight is sprayed and fused by a plasma gun on the wear surfaces of a steel impeller:

| | Percent |
|---|---|
| Tin | 6 |
| Bismuth | 6 |
| Silicon | 3.5 |
| Iron | 3.5 |
| Molybdenum | 16 |
| Tungsten | 3–4 |
| Nickel | Balance |

The layer is built up to 0.020 inch and then machined down to a thickness of 0.015 inch at which the impeller is of proper size.

The anti-galling and corrosion resistance properties are superior to the alloy of Thomas and Williams U.S. Pat. 2,743,176. The hardness is $R_c$ 30, and the yield strength and tensile strength are correspondingly good.

Example 2

The overlay alloy of Example 1 is applied by electric arc welding overlay, using a consumable electrode of nickel, and adding the other ingredients in a flux core under an atmosphere of argon. The results are effectively the same as those obtained in Example 1.

EXAMPLE 3

The procedure of Example 1 is carried out on a pump impeller in which the overlay has the following composition by weight:

| | Percent |
|---|---|
| Tin | 6 |
| Bismuth | 6 |
| Silicon | 3.5 |
| Boron | 3.5 |
| Iron | 3.5 |
| Molybdenum | 28 |
| Nickel | Balance |

The properties of the alloy are as follows. The alloy is softer and not quite as strong as the alloy in Example 1.

In operation, the parts to be coated are machined below size, and the metal to be coated is preferably prepared by grit blasting or otherwise. The metal being coated may optionally be preheated to say 500° F. The technique of applying the plasma spray with argon or other inert gases is well known except for the metal of the alloy which has been discussed above.

In view of our invention and disclosure, variations and modifications to meet individual whim or particular need will doubtless become evident to others skilled in the art to obtain all or part of the benefits of our invention without copying the process, alloy and structure shown, and we, therefore, claim all such insofar as they fall within the reasonable spirit and scope of our claims.

Having thus described my invention what we claim as new and desire to secure by Letters Patent is:

1. An alloy essentially consisting of the following composition by weight:

| | Percent |
|---|---|
| Tin | 4–8 |
| Bismuth | 4–8 |
| Silicon | 2–5 |
| Boron | 2–5 |
| Iron | 4–7 |
| Molybdenum | 15–30 |
| Tungsten | 0–4 |
| Nickel | Balance |

2. An alloy of claim 1, which essentially consists of the following composition by weight:

| | Percent |
|---|---|
| Tin | 4–8 |
| Bismuth | 4–8 |
| Silicon | 2–5 |
| Boron | 2–5 |
| Iron | 4–7 |
| Molybdenum | 15–17 |
| Tungsten | 3–4 |
| Nickel | Balance |

3. An alloy of claim 1, which essentially consists of the following composition by weight:

| | Percent |
|---|---|
| Tin | 4–8 |
| Bismuth | 4–8 |
| Silicon | 2–5 |
| Boron | 2–5 |
| Iron | 4–6 |
| Molybdenum | 26–30 |
| Nickel | Balance |

4. A pump part having a steel base metal and a fused overlay of an alloy having the following composition by weight:

| | Percent |
|---|---|
| Tin | 4–8 |
| Bismuth | 4–8 |
| Silicon | 2–5 |
| Boron | 2–5 |
| Iron | 4–7 |
| Molybdenum | 15–30 |
| Tungsten | 0–4 |
| Nickel | Balance |

5. A pump part of claim 4, in which the fused overlay has the following composition by weight:

| | Percent |
|---|---|
| Tin | 4–8 |
| Bismuth | 4–8 |
| Silicon | 2–5 |
| Boron | 2–5 |
| Iron | 4–7 |
| Molybdenum | 15–17 |
| Tungsten | 3–4 |
| Nickel | Balance |

6. A pump part of claim 4, in which the fused overlay has the following composition by weight:

| | Percent |
|---|---|
| Tin | 4–8 |
| Bismuth | 4–8 |
| Silicon | 2–5 |
| Boron | 2–5 |
| Iron | 4–6 |
| Molybdenum | 26–30 |
| Nickel | Balance |

7. The method of forming a pump part which comprises depositing and fusing on a steel backing an alloy having the following composition by weight:

| | Percent |
|---|---|
| Tin | 4–8 |
| Bismuth | 4–8 |
| Silicon | 2–5 |
| Boron | 2–5 |
| Iron | 4–7 |
| Molybdenum | 15–30 |
| Tungsten | 0–4 |
| Nickel | Balance |

8. A method of claim 7, in which the alloy has the following composition by weight:

| | Percent |
|---|---|
| Tin | 4–8 |
| Bismuth | 4–8 |
| Silicon | 2–5 |
| Boron | 2–5 |
| Iron | 4–7 |
| Molybdenum | 15–17 |
| Tungsten | 3–4 |
| Nickel | Balance |

9. A method of claim 7, in which the alloy has the following composition by weight:

| | Percent |
|---|---|
| Tin | 4–8 |
| Bismuth | 4–8 |
| Silicon | 2–5 |
| Boron | 2–5 |
| Iron | 4–6 |
| Molybdenum | 26–30 |
| Nickel | Balance |

References Cited
UNITED STATES PATENTS

| | | | |
|---|---|---|---|
| 1,675,798 | 7/1928 | Franks | 75—170 |
| 1,715,541 | 6/1929 | Elmen | 75—170 |
| 1,771,773 | 7/1930 | Contal | 75—170 |
| 1,986,585 | 1/1935 | Kroll | 75—170 |
| 2,878,410 | 3/1959 | Millis | 29—196.6 |
| 2,936,229 | 5/1960 | Shepard | 75—170 |

HYLAND BIZOT, Primary Examiner

U.S. Cl. X.R.

75—170; 117—131